United States Patent [19]

Rao et al.

[11] Patent Number: 5,136,596
[45] Date of Patent: Aug. 4, 1992

[54] BROADLY TUNABLE, HIGH REPETITION RATE SOLID STATE AND DYE LASERS AND USES THEREOF

[75] Inventors: Rama Rao, Coram; Gary Vaillancourt, Bayport, both of N.Y.

[73] Assignee: Excel Technology, Inc., Holbrook, N.Y.

[21] Appl. No.: 412,743

[22] Filed: Sep. 26, 1989

[51] Int. Cl.⁵ .................................................. H01S 3/10
[52] U.S. Cl. ........................................ 372/20; 372/71; 372/92; 372/102; 372/108
[58] Field of Search .................... 372/92, 99, 23, 20, 372/71, 102, 108

[56] References Cited

U.S. PATENT DOCUMENTS

| | | | |
|---|---|---|---|
| 4,229,710 | 10/1980 | Shoshan | 331/94.5 |
| 4,559,500 | 12/1985 | McDermid et al. | 330/4.3 |
| 4,761,786 | 8/1988 | Baer | 372/10 |
| 4,847,850 | 7/1989 | Kafka et al. | 372/71 |
| 4,873,692 | 10/1989 | Johnson et al. | 372/10 |
| 4,894,831 | 1/1990 | Alfrey | 372/99 |
| 4,901,322 | 2/1990 | Kangas | 372/20 |
| 4,932,031 | 6/1990 | Alfano et al. | 372/10 |

FOREIGN PATENT DOCUMENTS 0144992  11/1980  Fed. Rep. of Germany ........ 372/20

OTHER PUBLICATIONS

Daneshuar-Hossein et al., "A Microprocessor-controlled laser grating system for laser tuning", *Optics and Laser Technology*, Jun. 1982, pp. 137–142.

Primary Examiner—James W. Davie
Attorney, Agent, or Firm—Pennie & Edmonds

[57] ABSTRACT

Solid state and dye lasers are described which are tunable over a wide spectral region, are operable at high repetition rate, are uniformly narrow in spectral width over the tuning range, and produce a spatially uniform, single longitudinal mode beam. In one embodiment having a simple grazing-incidence cavity, the laser comprises: (a) a longitudinal pump beam with a KiloHertz (KHz) repetition rate; (b) a resonating cavity comprising a first fixed mirror, a diffraction grating, and a second rotatable mirror; and (c) an active solid state or dye medium within the cavity. In this embodiment, (i) the pump beam is passed through the fixed mirror and directed at the active medium; (ii) the emission from the active medium strikes the grating near a grazing angle; (iii) the rotatable mirror is placed at a first order diffraction position from the grating and reflects the desired wavelength radiation back into the cavity; and (iv) the output is derived from the grating at the zeroeth diffraction order.

20 Claims, 6 Drawing Sheets

BROADLY TUNABLE, HIGH REPETITION RATE SOLID STATE AND DYE LASERS AND USES THEREOF

This invention was made with Government support under contract No. 8700034 awarded by the National Science Foundation. The Government has certain rights in this invention.

BACKGROUND OF THE INVENTION

Tunable lasers have been known for some time. FIG. 1 illustrates a simple tunable laser configuration 10. It comprises a tunable solid state active medium or a dye solution 12 which is excited by a suitable laser 14 emitting an excitation laser beam $\lambda_L$. A resonator is formed by a pair of mirrors 16, 18, of which mirror 16 has a high reflectance while mirror 18 is partially transmitting. A stimulated laser beam $\lambda_{tunable}$ is output through partially transmitting mirror 18. In this illustration excitation beam $\lambda_L$ and tunable laser beam $\lambda_{tunable}$ are at right angles, a configuration known in the art as transverse pumping.

In the transverse pumping arrangement, the population inversion in the active medium is non-uniform along the path of the excitation laser beam since the beam is attenuated in the active medium. This gives rise to large diffraction loss and large beam divergence.

A better configuration for laser pumped tunable lasers is the longitudinal pumping arrangement 20 of FIG. 2. Again, this arrangement comprises an active medium 22, an excitation laser 24, and two spaced mirrors 26, 28 that define a resonator cavity. However, in this arrangement an excitation beam $\lambda_L$ passes through one of the resonator cavity mirrors 26 of the tunable laser cavity. While entry mirror 26 transmits the excitation radiation, it almost totally reflects the tunable laser emission. The second mirror 28 is a partially transmitting mirror that serves as an "exit" or output mirror that permits emergence of a tunable laser output $\lambda_{tunable}$. This configuration leads to greater spatial uniformity of the tunable laser beam.

The output of the lasers described in FIGS. 1 and 2 above has a rather broad bandwidth because tunable solid state crystals or dyes generally have wide fluorescence spectra. The broadband fluorescence can be used advantageously to tune a laser, i.e., to readily obtain highly monochromatic laser emission of any given frequency within the fluorescence spectrum. Fine tuning of the laser wavelength and simultaneous attainment of narrow linewidth can be achieved by using wavelength-selective elements in the resonator cavity.

One method which is commonly used for achieving a small spectral linewidth employs one or more birefringent filters and/or etalons in the resonator cavity. One drawback of this method is that alignment becomes very complicated because of multiple elements in the cavity. Furthermore, each element introduced into the cavity produces loss of the output power.

Another method makes use of devices for spatial wavelength separation. FIG. 3 illustrates a resonator 30 comprising an active medium 32, a mirror 36 and a rotatable grating 38. The grating is set at the Littrow mount position and autoreflects radiation of the desired wavelength back to the active medium. This class of resonator is also not free of problems. First, the grating may be damaged by a high power incident beam. Second, in this configuration only a small area of the grating can be illuminated resulting in a poor spectral resolution. Both of these problems are solved in resonator 40 of FIG. 4 by the use of beam expanding optics 39 with the same components as in resonator 30. However, the introduction of beam-expanding optics often causes undesirable reflection losses, complicates optical alignment, and increases the sensitivity to thermal damage.

Furthermore, most of the above mentioned lasers operates at a relatively low repetition rate of about 10 Hz limiting the capability of data acquisition and reducing the signal to noise ratio. Moreover, bulkiness of the laser configuration gives rise to long cavity lengths L. As a result, the free spectral range C/2L (C is the velocity of light) which is the reciprocal of the time it takes a light beam to make a round trip between the cavity mirrors is correspondingly small; and undesirable mode hopping can result.

Thus there is a need for a spectrally narrow linewidth tunable laser having a high output repetition rate that does not compromise other properties.

SUMMARY OF INVENTION

In accordance with the invention, solid state and dye lasers have been devised which are tunable over a wide spectral region, are operable at high repetition rate, are uniformly narrow in spectral width over the tuning range, and produce a spatially uniform, single longitudinal mode beam.

In one embodiment having a simple grazing-incidence cavity, the laser comprises:
(a) a longitudinal pump beam with a KiloHertz (KHz) repetition rate;
(b) a resonating cavity comprising a first fixed mirror, a diffraction grating, and a second rotatable mirror; and
(c) an active solid state or dye medium within the cavity;

In this embodiment,
(i) the pump beam is passed through the fixed mirror and directed at the active medium;
(ii) the emission from the active medium strikes the grating near a grazing angle;
(iii) the rotatable mirror is placed at a first order diffraction position from the grating and reflects the desired wavelength radiation back into the cavity; and
(iv) the output is derived from the grating at the zeroeth diffraction order.

In a second embodiment having an internally self-injected grazing-incidence cavity, the laser comprises:
(a) a longitudinal pump beam with a KHz repetition rate;
(b) a main non-dispersive resonating cavity comprising a fixed high reflectance mirror, an active medium, and a partially transmitting output coupler; and
(c) a narrow line auxiliary cavity situated inside the main cavity and comprising a grating at grazing incidence and a tuning mirror at the first order from the grating, the output coupler being located at the zeroeth order from the grating.

In a third embodiment having an externally self-injected grazing incidence cavity, the laser comprises:
(a) a longitudinal pump beam with a KHz repetition rate;
(b) a main non-dispersive resonating cavity comprising a fixed high reflectance mirror, an active medium, and a partially transmitting output coupler; and (c) a narrow line auxiliary cavity situated outside the main cavity and comprising a grating at grazing incidence and a tuning mirror at the first order from the grating, the output coupler being located at the zeroeth order from the grating.

In a fourth embodiment which provides a GigaHertz (GHz) repetition rate laser, the laser comprises:

(a) an extremely short cavity (<10 cm.) which generates a train of equally spaced pulses with a C/2L(1–10 GHz) repetition frequency; and either (b) a simple grazing-incidence cavity as described above with a thin saturable dye cell in the cavity for passive mode-locking at a GHz repetition rate; or (c) an internally self-injected grazing-incidence cavity as described above with a thin saturable dye inside the main cavity for passive mode-locking at a GHz repetition rate; or (d) an externally self-injected grazing-incidence cavity as described above with a thin saturable dye cell inside the main cavity for passive mode-locking at a GHz repetition rate.

Because very few optical elements are used in this design, the unit is less sensitive to temperature change, simple to align and extremely compact. As a result, the cavity can be quite short. This extremely short cavity has immediate benefits in terms of obtainable spectral linewidth, low amplified spontaneous emission (noise) and the ability to generate a high repetition rate tunable laser beam.

To increase the repetition rate while maintaining the spectral and spatial quality of the laser output, the present invention also provides a configuration of the active medium (solid state or dye) that minimizes frequency jitter and intensity fluctuation.

The laser of the present invention has numerous applications because of its advantageous operating parameters. High resolution spectroscopic studies can be performed with this laser because its spectral linewidth is comparable to the atomic and molecular transitions. The high repetition rate of the KHz lasers provides 100 times faster excitation and data acquisition rate than the standard 10 Hz laser system. This permits sophisticated signal averaging needed to improve the signal to noise ratio. The high repetition rate also provides high average power which compares favorably with that available from cw dye lasers. Furthermore, high peak power with the pulsed nature of the laser allows efficient use of the system for nonlinear optical processes. For example, frequency up-conversion of a tunable Ti:sapphire laser can provide tunable radiation across the entire spectrum from ultraviolet to infrared.

The combination of relatively high output power and frequency selectivity makes the present invention especially advantageous in the photodynamic treatment of cancer. In such treatment precise control of the frequency of the treating laser beam is needed to treat a localized malignant tumor with minimal effect on surrounding healthy tissue.

In remote sensing applications, a kilohertz repetition rate can provide enhanced capability of discrimination among different constituents of the atmosphere by increasing the signal to noise ratio.

The GHz repetition rate tunable laser is especially useful in communications. For example, it can provide a space-to-space communications data rate in excess of 1 Gigabit/sec (Gbit/sec) to allow rapid communication, acquisition and tracking.

In the context of ballistic missile defense, the lethality of a laser beam can be increased by hitting the target with a sequence of pulses. Serial pulses with subnanosecond interpulse separation permit a large cumulative impulse delivery. Thus mechanical damage to the target can be maximized by delivering a series of short pulses instead of a single long pulse.

BRIEF DESCRIPTION OF THE DRAWINGS

These and other objects, features, and advantages of the invention will be more clearly understood from the following detailed description of preferred embodiments of the invention in which.

DESCRIPTION OF THE PREFERRED EMBODIMENTS

1. Simple Grazing Incidence Cavity

Figure 1:
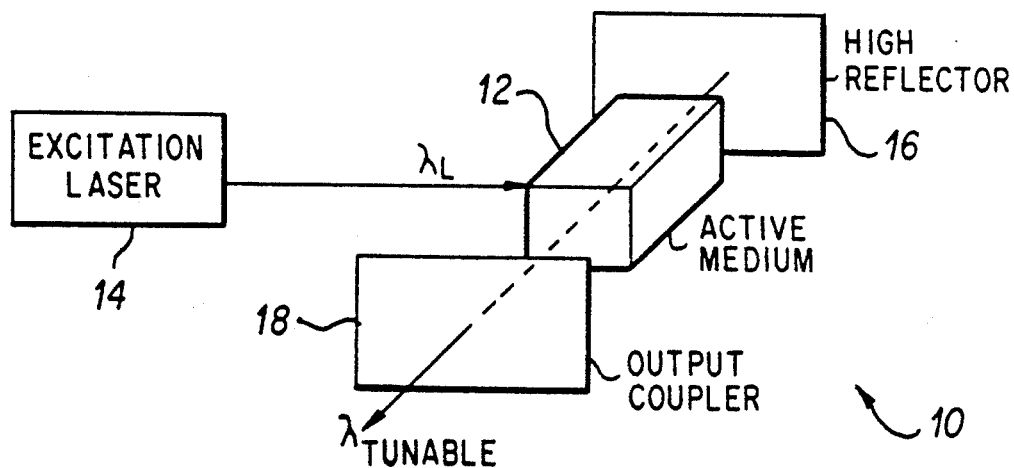
FIG. 1 illustrates a prior art transversely pumped tunable laser.
Figure 2:
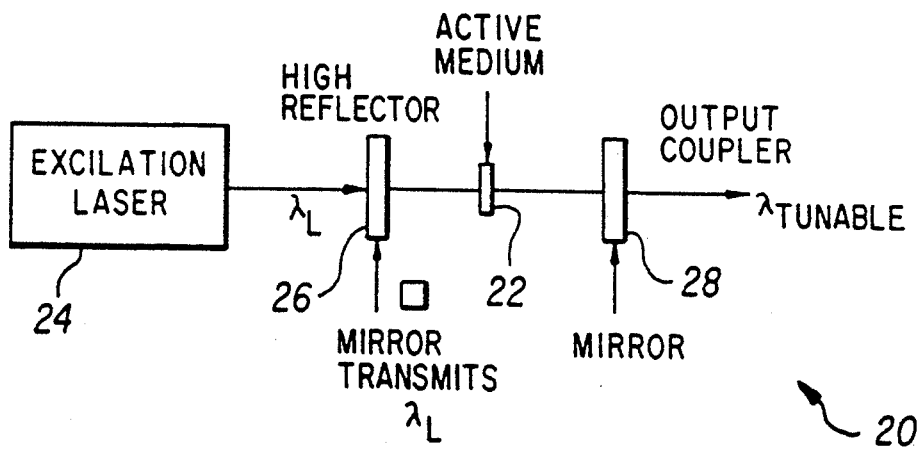
FIG. 2 illustrates a prior art longitudinally pumped tunable laser.
Figure 3:
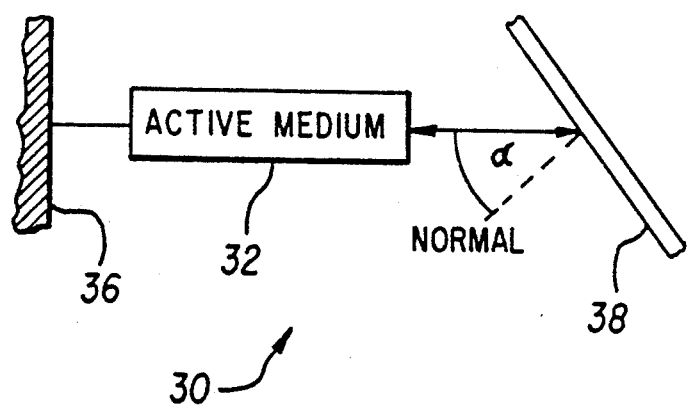
FIG. 3 illustrates a prior art wavelength-selective resonator which makes use of the dispersive property of the grating.
Figure 4:
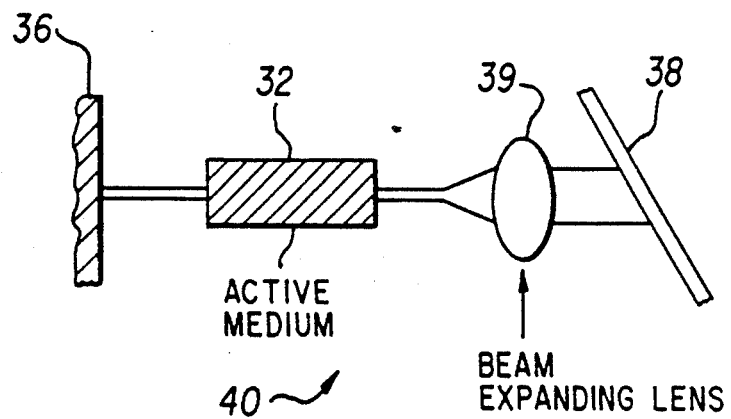
FIG. 4 illustrates a resonator similar to that of FIG. 3 except that beam expanding optics has been added to illuminate the larger width of the grating.
Figure 5:
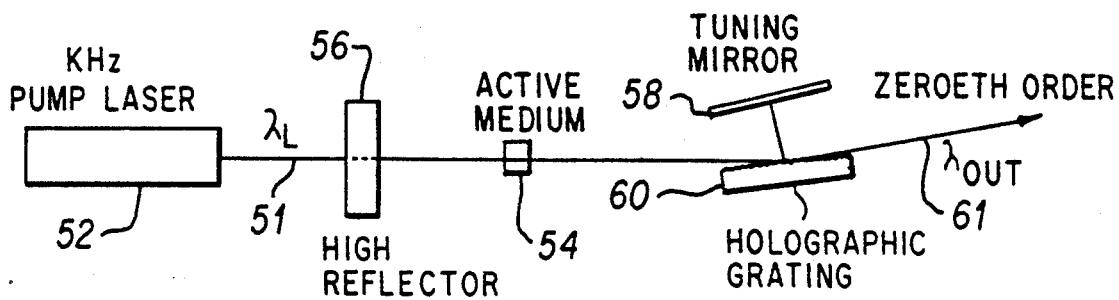
FIG. 5 illustrates a preferred embodiment of a simple grazing-incidence cavity design of a KHz repetition rate tunable laser (either solid state or dye) of the present invention.

FIG. 5 depicts a preferred embodiment of a high repetition rate tunable laser 50 of the present invention using a simple grazing incidence cavity. As shown therein, a pump beam 51 generated by a KHz repetition rate pump laser 52 is directed at an active medium 54 (solid state crystal or dye) in a longitudinal direction, i.e., collinear or nearly collinear (angle $\leq 5°$) with the optic axis of a resonator cavity 55. The resonator cavity is formed by a broadband high reflectance mirror 56, which transmits the pump beam while serving as a total reflector to a tunable emission beam 61, and a high reflectance tuning mirror 58. A diffraction grating 60 which illustratively is a holographic grating is mounted in the cavity so that a beam collinear with the optic axis will strike it near grazing incidence. Tuning mirror 58 is placed so as to intercept the mth order of diffraction of the desired wavelength of the emission beam 61 and is oriented so as to reflect such mth order of diffraction back on itself. In a preferred embodiment this tuning mirror is placed at the first order of diffraction.

In this arrangement, a small fraction of the beam incident on the grating is diffracted, the larger part being reflected out as useful output in the zeroeth order reflection. Of the diffracted beam, only a small selected range of wavelengths is directly reflected back, i.e., retraces its path towards the grating. These wavelengths are diffracted once more by the grating and are directed back to the active medium for further amplification. As is well known, the orientation of tuning 58 mirror with respect to the grating determines the selected wavelengths.

Figure 10:
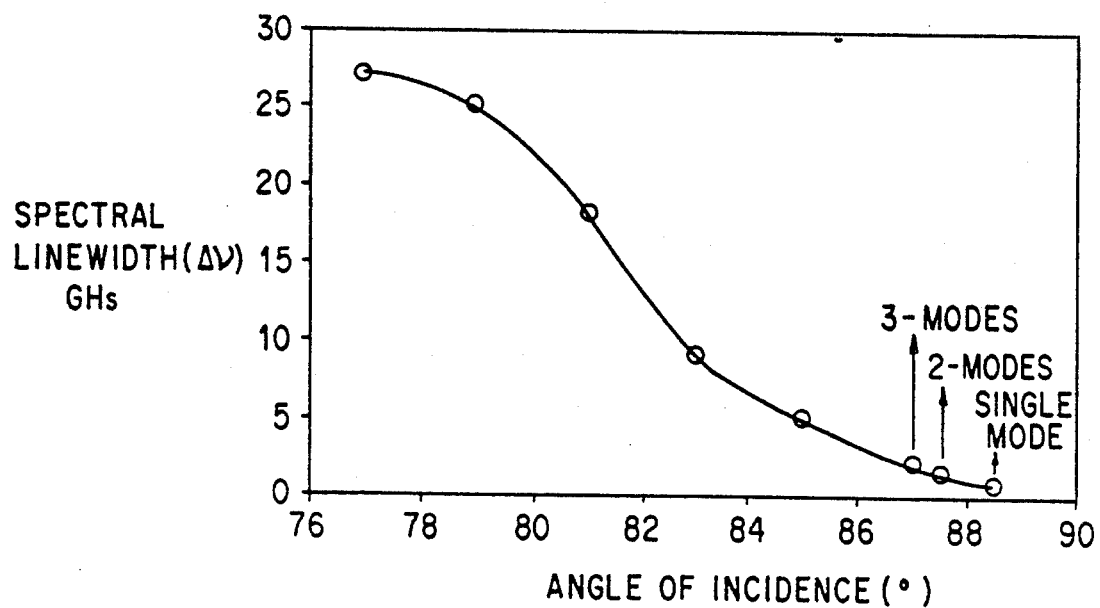
FIG. 10 shows the spectral linewidth versus angle of incidence at the grating for the simple grazing-incidence cavity design of a KHz repetition rate dye laser system.

It is important to note that the spectral resolution of the grating depends only on the illuminated length of the grating, not on the height, diffraction order, or groove spacing. Therefore, the closer the angle of incidence of the illuminating beam onto the grating approaches 90 degrees, the wider the beam and better the resolution. As a rule of thumb, spectral linewidth is given by operating wavelength divided by the number of grooves in the illuminated area of the grating. For a grating of 2400 lines/mm, if a 5 cm grating length is illuminated, the spectral linewidth is approximately 0.004 nm at 560 nm. This corresponds to a spectral linewidth less than 4 GHz. As shown in FIG. 10, the present invention has achieved spectral linewidth less than 750 MHz operating in a single longitudinal mode for an angle of incidence of 88.5 degree for a KHz repetition rate dye laser system.

Although the grating is generally fixed in position for normal operation, this is done only for the sake of minimizing the number of adjustments. Advantageously, the grating incidence angle may be adjusted to change the width of the illuminated area. This adjustment alters the spectral linewidth of the output beam. Thus variable spectral linewidth of the laser can be obtained by merely changing the angle of incidence at the grating.

For purpose of the present invention, the active medium can be any active medium suitable for lasing. Preferred active media include, but are not limited to dye solutions, e.g., Rhodamine 6G, 640, and solid state crystals e.g., Ti:Sapphire; Co:Magnesium Fluoride. Where dye solutions are used as the active medium, a transverse flow cell is advantageously used.

As described above, in the grazing incidence design, a major fraction of the beam leaves the resonator as useful output in the zeroeth order reflection from the grating. Therefore, zero order loss is avoided. However, this also means a small gain per oscillation. This main drawback can be remedied by decreasing the cavity length. Since the only optical component inside the cavity is the grating, the cavity length can be shortened significantly. In one embodiment of the present invention, the cavity length is maintained at less than 8 cm. As the round trip time in an 8 cm cavity is approximately 500 psec, there are at least 40 round trips during the excitation time ($=100$ nsec) of the pump pulse. As a result, even a small feedback from the grating is sufficient to stimulate emission at the desired wavelength.

It follows directly that low gain active medium such as crystals can be successfully used in this laser system.

There are additional benefits from reduced cavity length. First, as noted above the free spectral range between adjacent longitudinal modes is given by $C/2L$, where C is the velocity of light and L the cavity length. When L=10 cm, the free spectral range is so large ($C/2L=1.5$ GHz) that mode hopping is virtually eliminated. Therefore, the cavity has a natural tendency to run in a single longitudinal mode. Second, amplified spontaneous emission (ASE) background is dramatically reduced. ASE is due to single pass amplification, whereas lasing is due to multiple pass amplification. The small gain per pass in the instant invention greatly reduces noise relative to signal, generally to less than 0.01%.

In a preferred embodiment, the length of the grating is about 5 cm and the cavity length is 8 cm.

In any laser system, there is always a compromise between obtainable spectral linewidth and efficiency of the system. As the angle of incidence at the grating is increased, the spectral resolution improves (linewidth decreases) but at the cost of diffraction efficiency of the grating and thus overall efficiency of the system drops. This is shown in FIG. 10. In the present invention of a KHz repetition rate dye laser, a conversion efficiency of 20% was obtained at an angle of incidence of 78° (measured with respect to a normal to the grating) while the efficiency dropped to 2% at 88.5° where single longitudinal mode operation was obtained.

2. Internally Self-Injected Grazing-Incidence Cavity

Figure 6:
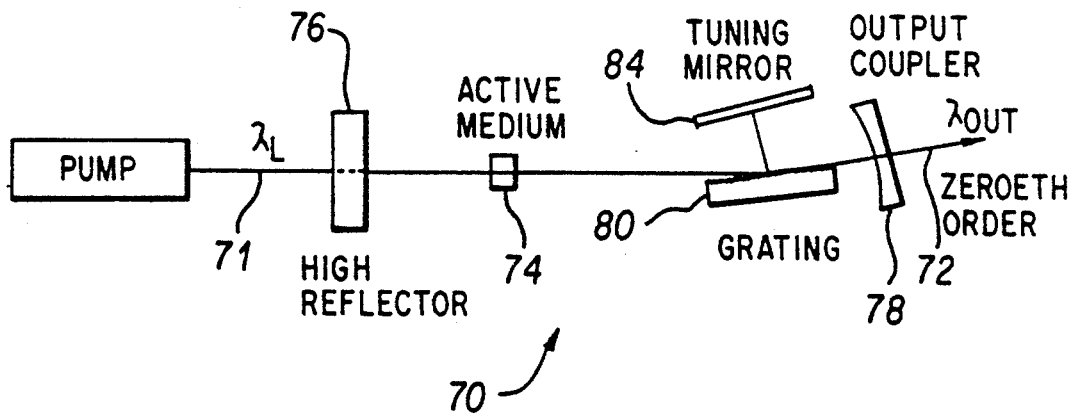
FIG. 6 illustrates a preferred embodiment of an internally self-injected grazing incidence cavity design of a tunable KHz repetition rate laser of the present invention.

To improve the efficiency of the previously described system while retaining the advantageously narrow spectral linewidth, a laser 70 was developed having an internally injected grazing-incidence cavity as shown in FIG. 6. In this design two cavities are formed; (1) a non-dispersive main cavity, and (2) a narrow-line auxiliary cavity. The main oscillator cavity is formed by a high reflectance mirror 76, an active medium 74 and an output coupler 78 placed at the zeroeth order from a grating 80. Again the active medium is pumped by a laser beam 71 emitted by pumping laser 72. As far as the main cavity is concerned, grating 80 simply acts like a tuning mirror. The auxiliary cavity is formed by placing a tuning mirror 84 so as to intercept the first order of diffraction from the grating. Useful output is obtained from the output coupler which passes a portion of the zeroeth order from the grating.

As is apparent this design adds an output coupler at the location of zeroeth order from the grating but in all other respects is the same as the embodiment of FIG. 5. In this configuration, the auxiliary cavity continuously injects a narrow line to control the stimulated emission process in the main cavity. Again due to the extremely short cavity length, there can be at least 40 round trips during the excitation time of the pump pulse (or during the time population inversion is maintained). In this way even a small feedback from the auxiliary cavity is sufficient to control the stimulated emission process in the main cavity. The only requirement on the injected radiation is that it has to exceed the noise (spontaneous emission) in its own spatial mode.

A simple analysis indicates that in a high gain amplifier, the noise is equivalent to an input power of:

$$P_O = 8 \, h\nu \, \Delta\nu$$

in which $h\nu$ is the photon energy and $\Delta\nu$ is the linewidth. This is equivalent to a power level in the range of 10 nanowatts for a visible photon of 1 GHz spectral linewidth. Even if we assume 2% efficiency of the grating at 88.5° (=1 GHz linewidth), the injected signal will be in the range of 100 $\mu$W for an output of 10 mW from the main cavity. This input signal is four orders of magnitude more than the minimum injected signal needed to overcome spontaneous noise.

As mentioned previously, a linewidth of less than 750 MHz with conversion efficiency of 2% was obtained in the simple grazing incidence cavity design. In contrast, in the self-injected configuration an improvement in the output power by a factor of ten was observed representing a conversion efficiency of 20%.

3. Externally Self-Injected Grazing-Incidence Cavity

Figure 7:
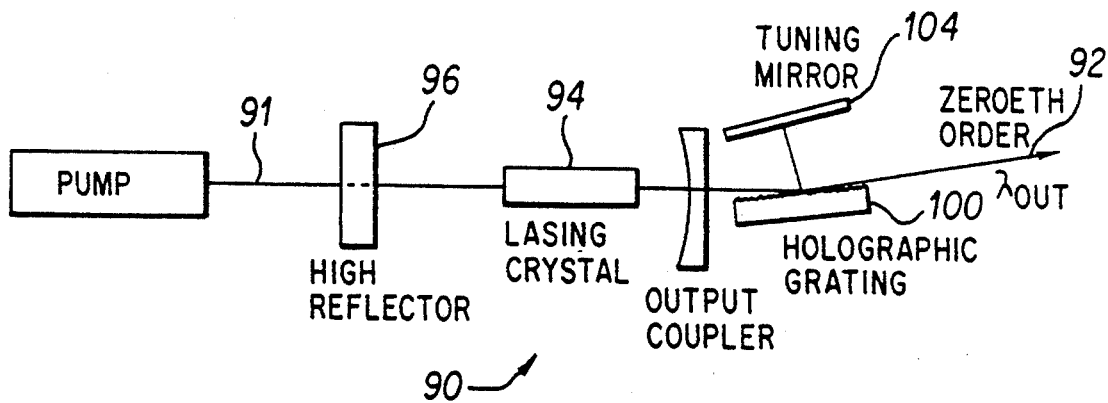
FIG. 7 illustrates a preferred embodiment of an externally self-injected grazing-incidence cavity design of a tunable KHz repetition rate solid state laser of the present invention.

In this embodiment, a laser 90 has an auxiliary cavity external to the main cavity as shown in FIG. 7. This embodiment is especially suited for solid state crystals (e.g., Ti:Sapphire; Co:Magnesium Fluoride) because of their lower gain compared to dye solutions. In this embodiment, the auxiliary cavity is used for injection seeding only.

The elements of laser 90 are the same as those of laser 70 and bear the same numbers increased by 20. In the case of laser 90, however, the auxiliary cavity is located on the outside of the output coupler rather than the inside.

If we assume 2% efficiency of the grating at 88.5° ($\approx 1$ GHz linewidth) and a 20% transmission by the output coupler, the injected signal through the output coupler will be in the range of 20 $\mu$W for an output of 10 mW from the main cavity. This input signal is almost three orders of magnitude more than the minimum desired injected signal to overcome the spontaneous noise.

Figure 8:
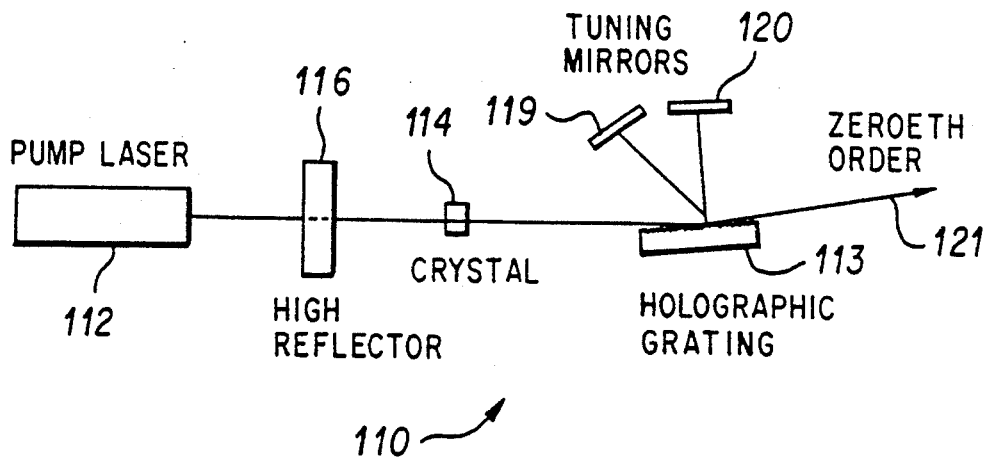
FIG. 8 illustrates a preferred embodiment of a simultaneous two frequency KHz repetition rate tunable laser of the present invention which can be used in the cavity designs shown in FIG. 5, 6 and 7.

The system can also be operated simultaneously in a two-frequency mode as for remote sensing applications, as in laser 110 shown in FIG. 8. The components of laser 110 are the same as those of FIG. 5 and bear the same numbers increased by 60. In this configuration a second tuning mirror 119 is positioned at the second order diffracted beam from the grating. This creates a second feedback channel, resulting in a double frequency narrow band lasing. As the output is derived through the zeroeth order from the grating, the two output frequencies can be independently tuned by the rotation of the mirrors M1 and M2 and the two output beams are exactly collinear.

4. A GigaHertz Repetition Rate Tunable Laser

The generation of ultrashort pulses by mode-locking is well known from gas and solid state lasers. However, in the present invention, because of the extremely short cavity of all three grazing-incidence cavity designs, even shorter pulses at very high repetition rate can be obtained. As the light circulates inside the resonator with a repetition rate determined by the round trip transit time, a train of equally spaced pulses with a C/2L repetition frequency of 1-3 GHz can be generated for a cavity length of less than 10 cm.

Figure 9:
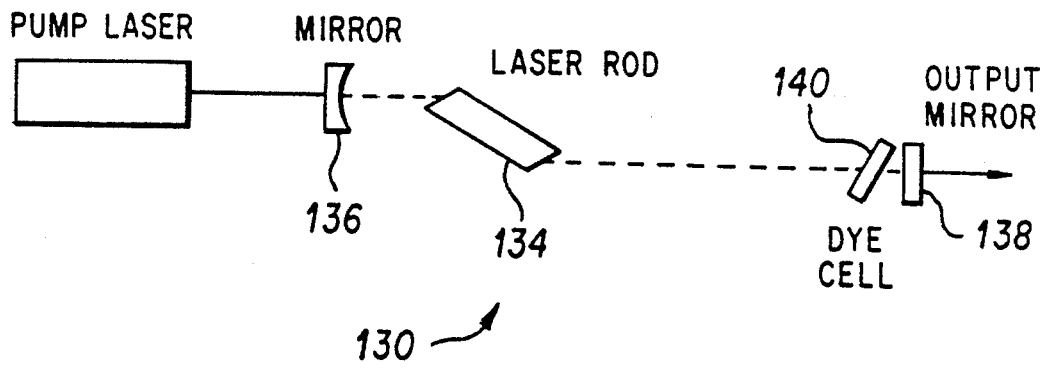
FIG. 9 illustrates a preferred embodiment of a GHz repetition rate tunable laser system of the present invention which can be used in the cavity designs shown in FIG. 5, 6 and 7.

In the present invention, short pulses at GigaHertz repetition rates were generated by passive mode-locking technique using a saturable absorber in the entire expected gain bandwidth of the active medium. As shown in FIG. 9, a laser 130 comprises a lasing medium 134, a high reflectance mirror 136 and an output mirror 138. A thin saturable dye-cell 140 which illustratively is 100 $\mu$ thick is placed just in front of the output mirror. Alternatively, the dye cell can be placed near the high reflectance mirror.

This type of GHz pulse generation can be successfully adopted in all three previously mentioned cavity designs; (i) simple grazing-incidence cavity, (ii) internally self-injected grazing-incidence cavity design, and (iii) externally self-injected grazing-incidence cavity design.

Examples of the practice of the invention are as follows.

EXAMPLE 1

In this example, an extremely stable, spectrally narrow ($\approx 500$ MHz) and single longitudinal mode tunable dye laser oscillator is described capable of operating at KHz repetition rate. An internally self-injected grazing-incidence cavity design has yielded an energy conversion efficiency of approximately 20%.

An extremely short cavity ($<5$ cm), longitudinally pumped, grazing-incidence design dye oscillator cavity was constructed as shown in FIG. 5. In order to extend the repetition rate while maintaining the spectral and spatial quality of the beam, a fast flow cell was designed to minimize non-stationary waves caused by the turbulence as well as pressure variation of the dye medium which are the major causes of frequency jitter and intensity fluctuation. The pump laser used was a cw, Q-switched, frequency-doubled Nd:YAG laser operating at 532 nm with maximum pump energy of approximately 180 $\mu$J, pulse duration of approximately 60 nsec, and with variable repetition rate of 1-3 KHz. In the grazing-incidence design, since there are no optical components except the diffraction grating inside the cavity, the length of the cavity is shortened to less than 5 cm. As described before, the short cavity design has a direct effect on the frequency stability, single mode operation and amplified spontaneous emission background in the dye laser output.

The observed spectral linewidth versus angle of incidence is plotted in FIG. 10. For angles of incidence 87°, 87.5°, and 88.5°, the system was observed to be oscillating in three modes, two modes and one mode, respectively. For any angle greater than this, due to the limitation in the available pump power, it became difficult to maintain stable laser operation. For single mode operation at 88.5°, with the Fabry-Perot set at 3 GHz FSR, the spectral linewidth of the laser is estimated to be approximately 500 MHz.

Figure 11:
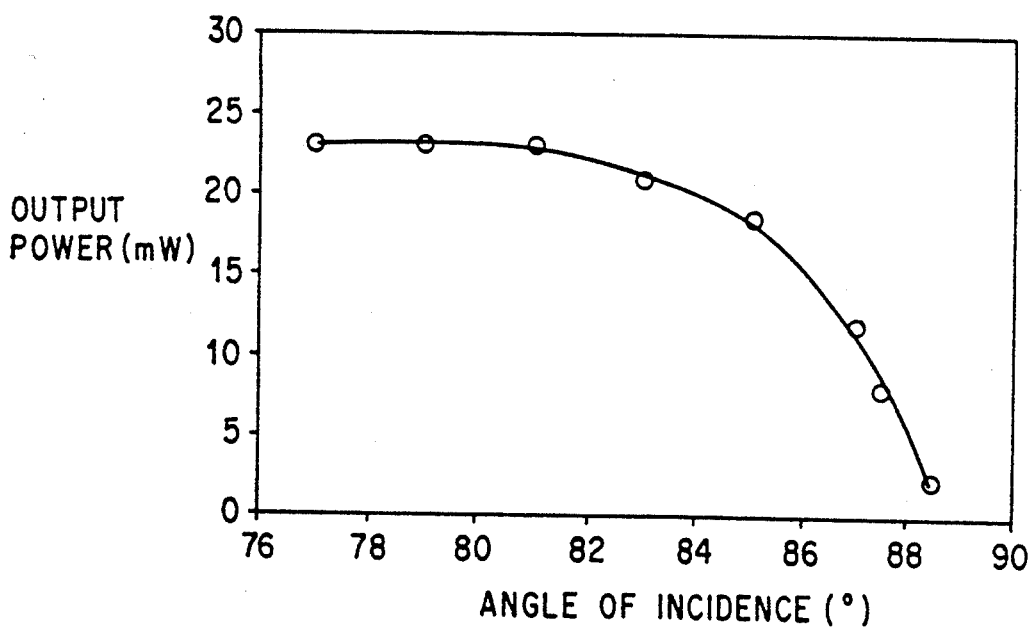
FIG. 11 is a plot of the angle of incidence versus dye laser output power for a KHz dye laser system with a simple grazing incidence cavity.

The output power versus angle of incidence for this laser is plotted in FIG. 11. The maximum absorbed pump power at 532 mm was 180 mW at 1 KHz. For an angle of incidence of 78°, a conversion efficiency of 20% with 20 mW output was observed. However, as the angle is increased to 88.5°, the output power dropped rapidly to 2-3 mW, representing an efficiency of 2%.

In an attempt to improve the efficiency of the laser while retaining the spectral linewidth, an internally self-injected grazing-incidence cavity was designed. In this setup, two cavities were formed; (a) a nondispersive main cavity, and (b) a narrow line auxiliary cavity. This was accomplished by simply adding an output coupler at the location of the zeroeth order beam from the grating as shown in FIG. 6. In this configuration, the auxiliary cavity continuously injects a narrow line to control the stimulated process in the main cavity. As the round trip time in a 5 cm cavity is 300 psec, there can be at least 60 round trips during the time (approximately 20 nsec) that the population of the dye medium is inverted. In this way even a small feedback from the auxiliary cavity is sufficient to control the stimulated emission from the main cavity.

In the self-injected grazing-incidence configuration, the output was improved by a factor of ten to a conversion efficiency of 20%. However, spectral linewidth was observed to be slightly broadened. This broadening is attributed to the mismatch in the main cavity length (L) to the resonant wavelength ($\lambda$) of the injected signal due to poor mechanical mounts used in the present experiment.

EXAMPLE 2

In this example is described successful development of an all solid state KHz repetition rate Ti:Sapphire laser capable of delivering average power exceeding 250 mW with a pulse duration 12 nsec and peak power in excess of 25 KW. This laser is tunable in a wide spectral region from 670 nm–1070 nm.

In an attempt to develop an all solid state high repetition rate Nd:YLF/Ti:Sapphire laser, a cw Q-switched, frequency doubled Nd:YLF laser was first developed operating at 527 nm and capable of delivering large pulse energy (1.5–2 mJ), long pulse width (0.2–0.3 $\mu$sec) at a high repetition rate (1–3 KHz). This laser was used to a pump Ti:Sapphire crystal in a longitudinal pumping configuration. Different crystal lengths and doping levels of $Ti^{3+}$ ions and variable pump pulse width were used to characterize the Ti:Sapphire laser performance.

Figure 12:
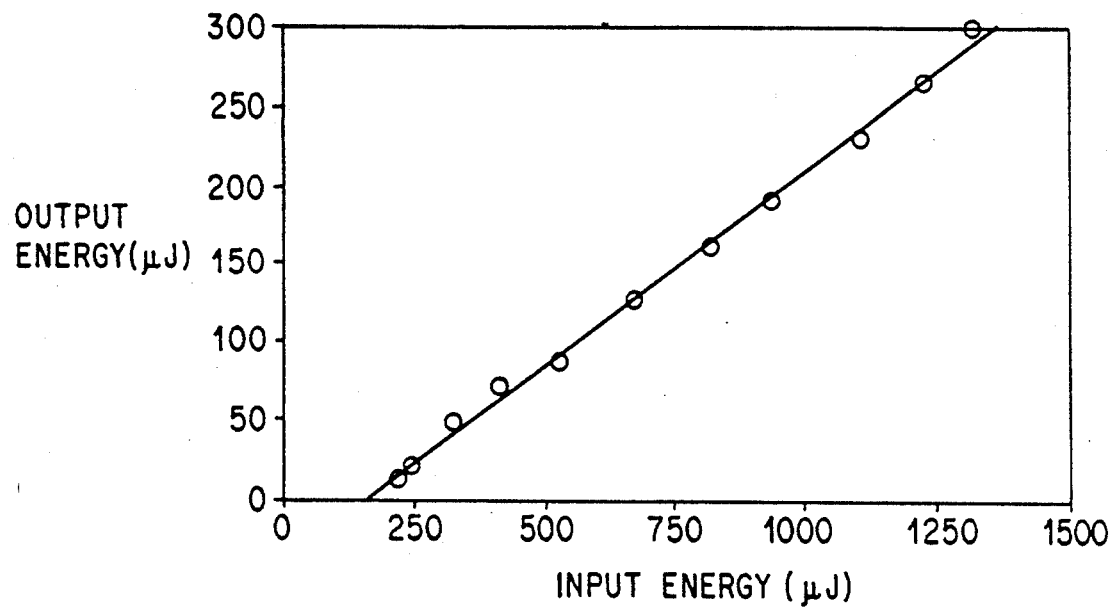
FIG. 12 is the observed input versus output energy for a Ti:sapphire laser operating at a KHz repetition rate.

The Ti:Sapphire laser system was successfully operated in the repetition rate range of 1–3 KHz. The output versus input energy (not absorbed energy) for T=20% is shown in FIG. 12. Here, the pump laser was operating at 1 KHz with pump pulse width of 0.2 $\mu$sec. A system efficiency of 23% with threshold pump energy of 200 $\mu$J was obtained.

The temporal output of the Ti laser was observed to be considerably shorter than the pump pulse width, a characteristic of gain switched operation. The laser pulse width ranged from 30 nsec to 12 nsec, the pulse width decreasing with increasing pump energy. As expected, the delay between the pump and laser pulses was observed to be decreasing with the incident pump energy.

A systematic study of pump pulse width versus Ti:Sapphire laser output has revealed that the photon conversion efficiency as well as the threshold pump energy seemed to increase with the pump pulse width. It is generally believed that for a pump pulse width that is shorter than the upper state lifetime (3 $\mu$sec), the Ti:Sapphire laser output should scale only with the incident energy density.

Figure 13:
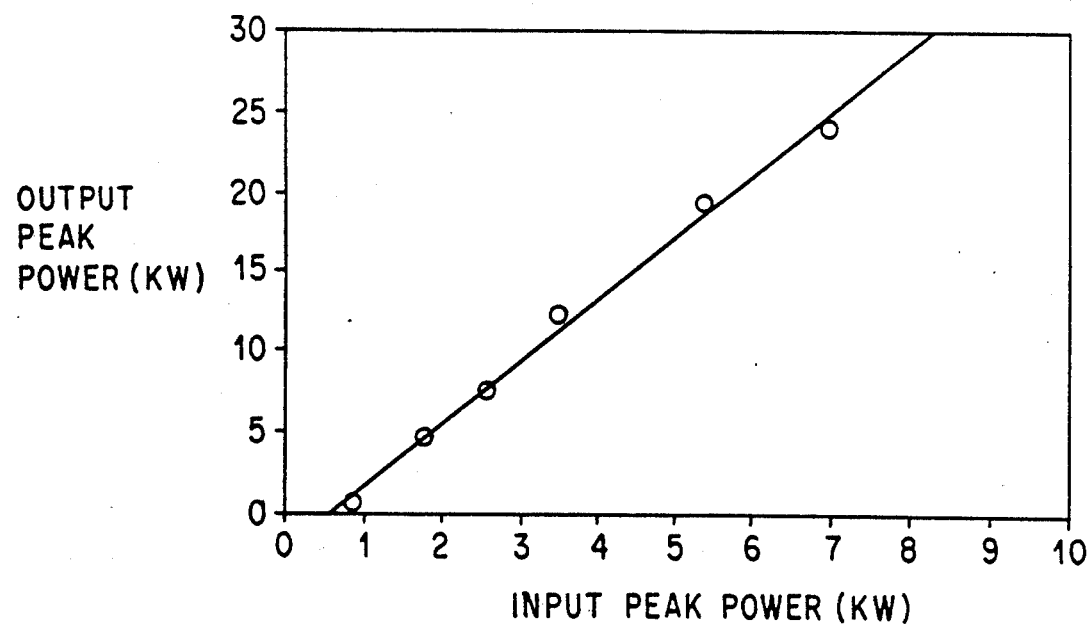
FIG. 13 is a plot of input versus output peak power for a Ti:sapphire laser operating in the 1-3 KHz range.

Input peak power versus output peak power is plotted in FIG. 13. These data were obtained by varying the repetition rate and hence the pulser width (peak power) of the pump laser. The output peak power was observed to increase linearly with the input peak power. Due to the gain switched operation, a peak power conversion efficiency of 350% was obtained with output peak power exceeding 25 KW.

Figure 14:
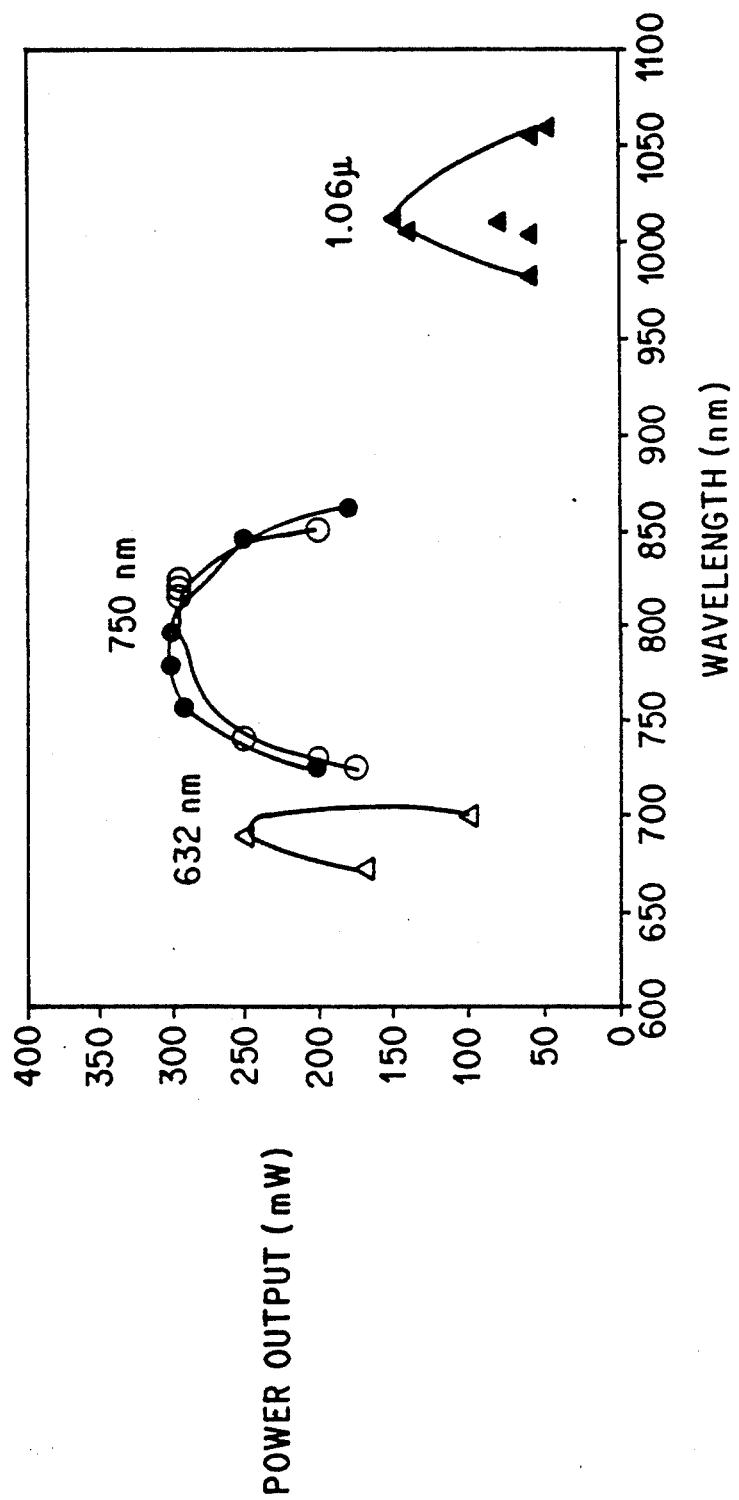
FIG. 14 is a plot of power output of a kilohertz Ti:sapphire laser over different tuning ranges using different sets of available optics.

Observed tuning curves of the laser with different sets of optics centered around 632 nm, 750 nm, and 1.06 $\mu$ are shown in FIG. 14. Due to the long pulse width of the present pump laser, the output in the extended region of the gain distribution, on both the short and long wavelength side, did not drop off significantly. The output at 675 nm, 800 nm, and 1.0 $\mu$ were observed to be 200 mW, 300 mW, and 150 mW, respectively, for an input power of 1.3 Watt at a 1 KHz repetition rate.

What is claimed is:
1. A laser system comprising:
   a longitudinal pump beam;
   a resonating cavity sufficiently short in length to support a laser pulse repetition rate greater than 1 kHz comprising a first fixed mirror, a diffraction grating and a second rotatable mirror; and
   an active medium within the cavity, wherein:
   a) the pump beam is passed through the fixed mirror and directed at the active medium;
   b) the grating is mounted on an optic axis defined by the fixed mirror and the active medium near a grating angle;
   c) the fixed and rotatable mirrors reflect emissions from the active medium; and
   d) the rotatable mirror is placed in the first order diffraction position from the grating.

2. The laser system of claim 1 wherein the active medium is a fluorescent dye.

3. The laser system of claim 2 further comprising a flow cell through which the pump beam passes longitudinally and the dye transversely.

4. The laser system of claim 1 wherein the active medium is a crystal.

5. The laser system of claim 1 wherein said pump beam and said optic axis form an angle which is between about zero and about five degrees.

6. The laser system of claim 1 wherein said grazing angle is between 87 and 89.5 degrees as measured with respect to a normal to the grating.

7. The laser system of claim 1 wherein the grating length is about 5 cm and the resonating cavity length is about 8 cm.

8. The laser system of claim 1 wherein the rotatable mirror is rotatable about its center.

9. The laser system of claim 1 wherein:
   a) pump beam and said optic axis form an angle which is between about zero and about five degrees;
   b) said grazing angle is between 87 and 89.5 degrees; and
   c) the length of said resonating cavity is less than about 8 cm.

10. The laser system of claim 1 further comprising an output coupler placed in the zeroeth order diffraction position from the grating to form a main oscillator cavity comprising the output coupler, the diffraction grating, and the first fixed mirror.

11. The laser system of claim 1 further comprising an output coupler placed along the optic axis between the active medium and the diffraction grating to form a main oscillation cavity comprising the output coupler and the first fixed mirror.

12. The laser system of claim 1 further comprising a third rotatable mirror placed at a second order diffraction position from the grating to form a second feedback channel to yield two different output frequencies at the zeroeth order diffraction position of the grating.

13. The laser system of claim 1 wherein the active medium is a Ti:sapphire crystal.

14. The laser system of claim 1 wherein the pulse width the pump beam is greater than the round trip time within the resonating cavity so as to support multiple round trips of the emissions from the active medium.

15. A laser system comprising:
a longitudinal pump beam;
a resonating cavity comprising a first fixed mirror, a diffraction grating, a second rotatable mirror and an output coupler; and
an active medium within the cavity, wherein:
 a) the pump beam is passed through the fixed mirror and directed at the active medium;
 b) the grating is mounted on an optic axis defined by the fixed mirror and the active medium near a grazing angle;
 c) the fixed and rotatable mirrors reflect emissions from the active medium;
 d) the rotatable mirror is placed in the first order diffraction position from the grating to form a narrow-line auxiliary cavity; and
 e) the output coupler is placed in the zeroeth order diffraction position from the grating to form a main oscillator cavity comprising the output coupler, the diffraction grating, and the first fixed mirror.

16. The laser system of claim 15 wherein the pulse width of the pump beam is greater than the round trip time within the resonating cavity so as to support multiple round trips of the emissions from the active medium.

17. A laser system comprising:
a longitudinal pump beam;
a resonating cavity comprising a first fixed mirror, a diffraction grating, a second rotatable mirror and an output coupler; and
an active medium within the cavity, wherein:
 a) the pump beam is passed through the fixed mirror and directed at the active medium;
 b) the grating is mounted on an optic axis defined by the fixed mirror and the active medium near a grazing angle;
 c) the fixed and rotatable mirrors reflect emissions from the active medium;
 d) the rotatable mirror is placed in the first order diffraction position from the grating to form a narrow-line auxiliary cavity; and
 e) the output coupler is placed along the optic axis between the active medium and the diffraction grating to form a main oscillation cavity comprising the output coupler and the first fixed mirror.

18. The laser system of claim 17 wherein the pulse width of the pump beam is greater than the round trip time within the resonating cavity so as to support multiple round trips of the emissions from the active medium.

19. A laser system comprising:
a longitudinal pump beam;
a resonating cavity comprising a first fixed mirror, a diffraction grating, a second rotatable mirror and a third rotatable mirror; and
an active medium within the cavity, wherein:
 a) the pump beam is passed through the fixed mirror and directed at the active medium;
 b) the grating is mounted on an optic axis defined by the fixed mirror and the active medium near a grazing angle;
 c) the fixed and rotatable mirrors reflect emissions from the active medium;
 d) the second rotatable mirror is placed in the first order diffraction position from the grating; and
 e) the third rotatable mirror is placed at a second order diffraction position from the grating to form a second feedback channel to yield two different output frequencies at the zeroeth order diffraction position of the grating.

20. The laser system of claim 16 wherein the pulse width of the pump beam is greater than the round trip time within the resonating cavity so as to support multiple round trips of the emissions from the active medium.

* * * * *